(12) United States Patent
Hall et al.

(10) Patent No.: US 7,712,996 B2
(45) Date of Patent: May 11, 2010

(54) FOGGING SYSTEM FOR AN ASPHALT RECYCLING MACHINE

(76) Inventors: David R. Hall, 2185 S. Larsen Pkwy., Provo, UT (US) 84606; Codrin Daranga, 2185 S. Larsen Pkwy., Provo, UT (US) 84606; Timothy Duke, 2185 S. Larsen Pkwy., Provo, UT (US) 84606

( * ) Notice: Subject to any disclaimer, the term of this patent is extended or adjusted under 35 U.S.C. 154(b) by 643 days.

(21) Appl. No.: 11/457,670

(22) Filed: Jul. 14, 2006

(65) Prior Publication Data

US 2008/0014020 A1 Jan. 17, 2008

(51) Int. Cl.
*E21C 25/00* (2006.01)
(52) U.S. Cl. .......................... 404/90; 299/41.1
(58) Field of Classification Search ................... 404/90, 404/91, 111, 126, 132; 299/39.1, 41.1
See application file for complete search history.

(56) References Cited

U.S. PATENT DOCUMENTS

| | | | |
|---|---|---|---|
| 1,080,010 A * | 12/1913 | Ketring | ............... 404/126 |
| 1,887,341 A | 11/1932 | Venable | |
| 1,898,158 A | 2/1933 | Winkle | |
| 2,039,078 A | 4/1936 | Hertwig | |
| 2,098,895 A | 11/1937 | Velten | |
| 2,633,782 A | 4/1953 | Clement | |
| 2,893,299 A | 7/1959 | Moir | |
| 2,908,206 A | 10/1959 | Melanson | |
| 2,938,438 A | 5/1960 | Hamilton | |
| 3,075,436 A | 1/1963 | McRae | |
| 3,361,042 A | 1/1968 | Cutler | |
| 3,732,023 A | 5/1973 | Rank | |
| 3,796,505 A * | 3/1974 | Buhler | ............... 404/132 |
| 3,817,644 A | 6/1974 | Matson | |
| 3,970,404 A | 7/1976 | Benedetti | |
| 3,989,401 A | 11/1976 | Moench | |
| 4,018,540 A | 4/1977 | Jackson | |
| 4,104,736 A | 8/1978 | Mendenhall | |
| 4,124,325 A | 11/1978 | Cutler | |
| 4,127,351 A * | 11/1978 | Vural | ............... 404/72 |
| 4,172,679 A | 10/1979 | Wirtgen | |
| 4,195,946 A | 4/1980 | Swisher | |
| 4,215,940 A | 8/1980 | Lubbers et al. | |
| 4,261,669 A | 4/1981 | Edo | |
| 4,313,690 A | 2/1982 | Hojbjerg | |
| 4,335,975 A | 6/1982 | Schoelkopf | |
| 4,347,016 A | 8/1982 | Sindelar et al. | |
| 4,407,605 A | 10/1983 | Wirtgen | |
| 4,473,320 A | 9/1984 | Register | |
| 4,534,674 A | 8/1985 | Cutler | |

(Continued)

OTHER PUBLICATIONS

U.S. Appl. No. 11/421,105, filed May 31, 2006, Hall.

*Primary Examiner*—Gary S Hartmann
(74) *Attorney, Agent, or Firm*—Tyson J. Wilde; Benjamin T. Miskin (57) ABSTRACT

In one aspect of the invention, an asphalt recycling machine has a passageway in communication with a fluid source secured to a motorized vehicle and a fogging nozzle. The fogging nozzle is connected to an underside of the motorized vehicle. The fogging nozzle is also proximate a rotary degradation element connected to the underside of the motorized vehicle. The rotary degradation element has an axis of rotation nonparallel with a paved surface.

20 Claims, 14 Drawing Sheets

U.S. PATENT DOCUMENTS

| | | | |
|---|---|---|---|
| 4,594,022 A | 6/1986 | Jeppson | |
| 4,668,017 A | 5/1987 | Peterson | |
| 4,676,689 A | 6/1987 | Yant | |
| 4,692,350 A | 9/1987 | Clarke | |
| 4,784,518 A | 11/1988 | Cutler | |
| 4,793,730 A | 12/1988 | Butch | |
| 4,968,101 A | 11/1990 | Bossow | |
| 5,131,788 A | 7/1992 | Hulicsko | |
| 5,366,320 A | 11/1994 | Hanlon | |
| 5,556,225 A | 9/1996 | Marino | |
| 5,765,926 A | 6/1998 | Knapp | |
| 5,791,814 A | 8/1998 | Wiley | |
| 5,947,636 A | 9/1999 | Mara | |
| 5,947,638 A | 9/1999 | Heims | |
| 5,951,561 A | 9/1999 | Pepper | |
| 6,122,601 A | 9/2000 | Swanson | |
| 6,149,342 A * | 11/2000 | Phillips | 404/90 |
| 6,158,920 A | 12/2000 | Malot | |
| 6,287,048 B1 | 9/2001 | Hollon | |
| 6,371,689 B1 | 4/2002 | Wiley | |
| 6,416,249 B1 * | 7/2002 | Crupi | 404/91 |
| 6,551,018 B2 | 4/2003 | Baker | |
| 6,565,281 B2 * | 5/2003 | Bruns et al. | 404/90 |
| 6,577,141 B2 | 6/2003 | Gandrud | |
| 6,623,207 B2 | 9/2003 | Grubba | |
| 6,695,530 B2 * | 2/2004 | Crupi | 404/91 |
| 6,769,836 B2 | 8/2004 | Lloyd | |
| 6,799,922 B2 | 10/2004 | Smith | |
| 6,846,354 B2 | 1/2005 | Larsen | |
| 6,887,013 B2 * | 5/2005 | Ley et al. | 404/90 |
| 6,939,079 B2 * | 9/2005 | Lloyd | 404/91 |
| 7,004,675 B2 * | 2/2006 | Wayne | 404/91 |
| 7,179,018 B2 * | 2/2007 | Hall et al. | 404/90 |
| 7,287,818 B1 * | 10/2007 | Hall et al. | 299/41.1 |
| 7,387,464 B2 * | 6/2008 | Hall et al. | 404/94 |
| 7,473,052 B2 * | 1/2009 | Hall et al. | 404/75 |
| 2002/0172555 A1 * | 11/2002 | Crupi | 404/77 |
| 2004/0175234 A1 * | 9/2004 | Wayne | 404/91 |
| 2006/0196698 A1 * | 9/2006 | Hall et al. | 175/327 |
| 2006/0198697 A1 * | 9/2006 | Hall et al. | 404/75 |
| 2006/0198698 A1 * | 9/2006 | Hall et al. | 404/75 |
| 2006/0198702 A1 * | 9/2006 | Hall et al. | 404/93 |

* cited by examiner

```
┌─────────────────────────────────────────────────────┐
│ Provide an asphalt recycling machine with a         │
│ passageway in communication with a fluid source     │
│ secured to a motorized vehicle and a fogging nozzle │
│ connected to an underside of the motorized vehicle  │
│                                                1405 │
└─────────────────────────────────────────────────────┘
                          │
┌─────────────────────────────────────────────────────┐
│ Provide a rotary degradation element connected to   │
│ the underside of the motorized vehicle and          │
│ comprising an axis of rotation non-parallel with a  │
│ paved surface                                       │
│                                                1410 │
└─────────────────────────────────────────────────────┘
                          │
┌─────────────────────────────────────────────────────┐
│ Position the fogging nozzle so that it is proximate │
│ the rotary degradation element                      │
│                                                1415 │
└─────────────────────────────────────────────────────┘
                          │
┌─────────────────────────────────────────────────────┐
│ Degrade the paved surface with the rotary           │
│ degradation element to form a plurality of paved    │
│ surface constituents                                │
│                                                1420 │
└─────────────────────────────────────────────────────┘
                          │
┌─────────────────────────────────────────────────────┐
│ Fog the paved surface constituents with a           │
│ rejuvenating material from the fluid source as the  │
│ machine degrades the paved surface                  │
│                                                1425 │
└─────────────────────────────────────────────────────┘
```

Fig. 15

FOGGING SYSTEM FOR AN ASPHALT RECYCLING MACHINE

BACKGROUND OF THE INVENTION

Modern road surfaces typically comprise a combination of aggregate materials and binding agents processed and applied to form a smooth paved surface. The type and quality of the pavement components used, and the manner in which the pavement components are implemented or combined, may affect the durability of the paved surface. Even where a paved surface is quite durable, however, temperature fluctuations, weather, and vehicular traffic over a paved surface may result in cracks and other surface or sub-surface irregularities over time. Road salts and other corrosive chemicals applied to the paved surface, as well as accumulation of water in surface cracks, may accelerate pavement deterioration.

Road resurfacing equipment may be used to mill, remove, and/or recondition deteriorated pavement. In some cases, heat generating equipment may be used to soften the pavement, followed by equipment to mill the surface, apply rejuvenation materials, and plane the surface. Often, new rejuvenation materials may be combined with materials milled from an existing surface in order to recondition or recycle existing pavement. Once the new materials are added, the materials may be compacted and planed to restore a smooth paved surface.

U.S. Pat. No. 4,692,350 which is herein incorporated by reference for all that it discloses, teaches that substrates such as aggregates, particularly for road building, are coated with asphalt by foaming the asphalt and mixing the hot asphalt foam with the aggregate. The asphalt is foamed by dispersing water in the hot asphalt as to maintain the water in the liquid phase and then vaporizing the water to form the foam structure.

U.S. Pat. No. 6,846,354 which is herein incorporated by reference for all that is discloses, describes a process for preparing a warm mix asphalt composition by mixing an aggregate grain material with a soft binder, and adding a hard binder to the mixed aggregate grain material. The hard binder is foamed in a foaming process before it is introduced to the mixed grained aggregate material. A system for preparing the warm mix asphalt composition comprising a drying drum for heating and drying the aggregate component, a mixing mill for mixing the asphalt components and a mix storage silo, where the system also includes foam production facilities for foaming the hard binder before introduction to the mixing mill, is also disclosed.

U.S. Pat. No. 4,793,730 which is herein incorporated by reference for all that it contains, discloses a method and apparatus for renewing the surface of asphaltic paving at low cost and for immediate reuse. The asphalt surface is heated to about 300.degree.-500.degree. F. The surface is broken to a depth of about two inches and the lower material thoroughly mixed in situ with the broken surface material. After mixing, the material is further heated to fuse the heated mixture into a homogeneous surface. The surface is screeded for leveling and compacted by a road roller. A road machine is disclosed having a steam manifold for heating the asphalt, transversely reciprocating breaker bars having teeth adjusted to the depth desired, toothed mixing cylinders for mixing the broken material, and a second steam manifold for reheating the mixed material. Reciprocating screed bars on the road machine level the mixed and heated material. Final compacting may be done with a conventional road roller.

U.S. Pat. No. 4,261,669 which is herein incorporated by reference for all that it discloses, teaches a method and apparatus for repairing asphalt concrete road surfaces wherein a tractor a steam box and a car mounted with a screw cutter are coupled in this order and a series of linearly operated equipment is used on the asphalt concrete paved road surface, including a heater car, an asphalt finisher and a road roller in this order after the car. Each of the equipment is made to advance at low speed and the asphalt concrete paved road surface is artificially heated by the steam box to impart fluidity to the road surface, after which it is cut with the screw cutter and the cut asphalt concrete is conveyed into a heating chamber of the heater car, and water content in the asphalt concrete is removed by heating and stirring. The resulting asphalt concrete is adjusted to an optimum temperature suitable for asphalt concrete paving, and then is discharged from the heating chamber, and charged onto the surface of the cut road directly and thereafter the asphalt concrete paved road surface is tested by using the asphalt finisher and the road roller.

BRIEF SUMMARY OF THE INVENTION

An asphalt recycling machine has a passageway in communication with a fogging nozzle and a fluid source secured to a motorized vehicle. The fogging nozzle is connected to an underside of the motorized vehicle. The fogging nozzle is also proximate a rotary degradation element connected to the underside of the motorized vehicle. The rotary degradation element has an axis of rotation nonparallel with a paved surface.

In one embodiment of the present invention the fluid source may comprise an asphalt rejuvenating material. The rejuvenating material may comprise particles smaller than 200 microns. The rejuvenating material may comprise water, a gas, polymers, synthetic clay, wax, oil based substance, surfactant, maltenes, asphaltenes, or combinations thereof.

The asphalt recycling machine may comprise sensors proximate the fogging nozzle selected from the group consisting of pressure sensors, heat sensors, position sensors, optical sensors, and acoustic sensors.

The machine may comprise a heating element connected to the underside of the machine. The machine may comprise a fire extinguishing system proximate the fogging nozzle. The fire extinguishing system may comprise a temperature sensor. The machine may comprise a foaming asphalt injector connected to the underside of the machine. The machine may comprise a plurality of mixing elements connected to the underside of the machine. The machine may comprise a screed. The machine may also comprise a plurality of compacting elements connected to the underside of the machine.

The fogging nozzle may be positioned in-between at least two rotary degradation elements. The nozzle may be attached to a hollow rod which extends from the underside of the vehicle and a portion of the passageway may be in communication with the fluid source. The hollow rod may comprise a plurality of fogging nozzles. The passageway proximate the fogging nozzle may be pressurized to between 100 psi and 3000 psi. A fluid in the passageway and proximate the fogging nozzle may be heated to between 100 F and 225 F. The nozzle may be connected to a slideable carriage connected to a bearing surface of the underside.

A method for rejuvenating a paved surface comprises providing an asphalt recycling machine with a passageway in communication with a fluid source secured to a motorized vehicle and a fogging nozzle connected to an underside of the motorized vehicle; providing a rotary degradation element comprising a top end connected to a the underside of the motorized vehicle and comprising an axis of rotation nonparallel with the paved surface; positioning the fogging nozzle so that it is proximate the rotary degradation element; degrading the paved surface with the rotary degradation element to form a plurality of paved surface constituents; and fogging the paved surface constituents with a rejuvenating material from the fluid source.

DETAILED DESCRIPTION OF THE INVENTION AND THE PREFERRED EMBODIMENT

Figure 1:
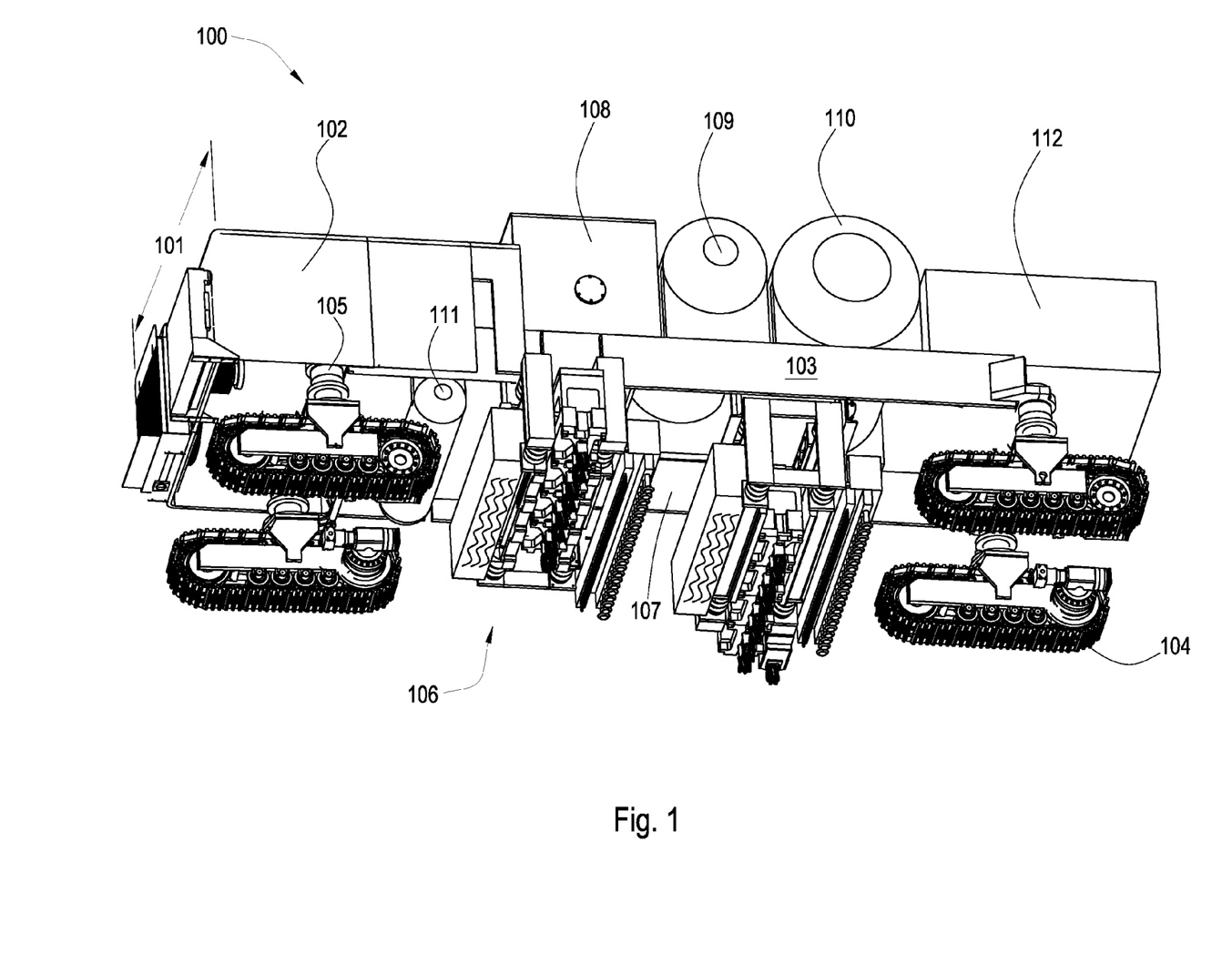
FIG. 1 is a perspective diagram of an embodiment of an asphalt recycling machine.

Referring to FIG. 1 in selected embodiments, a motorized vehicle 100 may be adapted to degrade and recycle a section of pavement substantially wider than the vehicles width 101. The motorized vehicle 100 may include a shroud 102, covering various internal components of the motorized vehicle 100, a frame 103, and a translational element 104 such as tracks, wheels, or the like, to translate or move the vehicle 100. The motorized vehicle 100 may also include means 105 for adjusting the elevation and slope of the frame 103 relative to the translational element 104 to adjust for varying elevations, slopes, patterns, or contours of the underlying pavement.

In selected embodiments, to facilitate degradation of a swath of pavement wider than the motorized vehicle 100, the vehicle 100 may include one or more slideable carriages 106 supported by a bearing surface of an underside 107 of the motorized vehicle 100 capable of extending beyond the outer edge of the vehicle 100. In some embodiments, the carriages 106 may be as wide as the vehicle 100. In such an embodiment, the carriages 106 may sweep over a width approximately twice the vehicle width 101.

Under the shroud 102, the motorized vehicle 100 may include an engine and hydraulic pumps for powering the translational elements 104, the carriages 106, or other components. Likewise, the vehicle 100 may include a tank 108 for storing hydraulic fluid; a fuel tank 109; a tank 110 for storing rejuvenation materials such as asphalt, bitumen, oil, tar, or the like; a water tank 111; a hopper 112 for storing aggregate such as gravel, rock, sand, grit, pebbles, macadam, concrete, or the like; or any other storage containers. The vehicle 100 may also comprise a heating element connected to the underside 107 for heating the paved surface.

Figure 2:
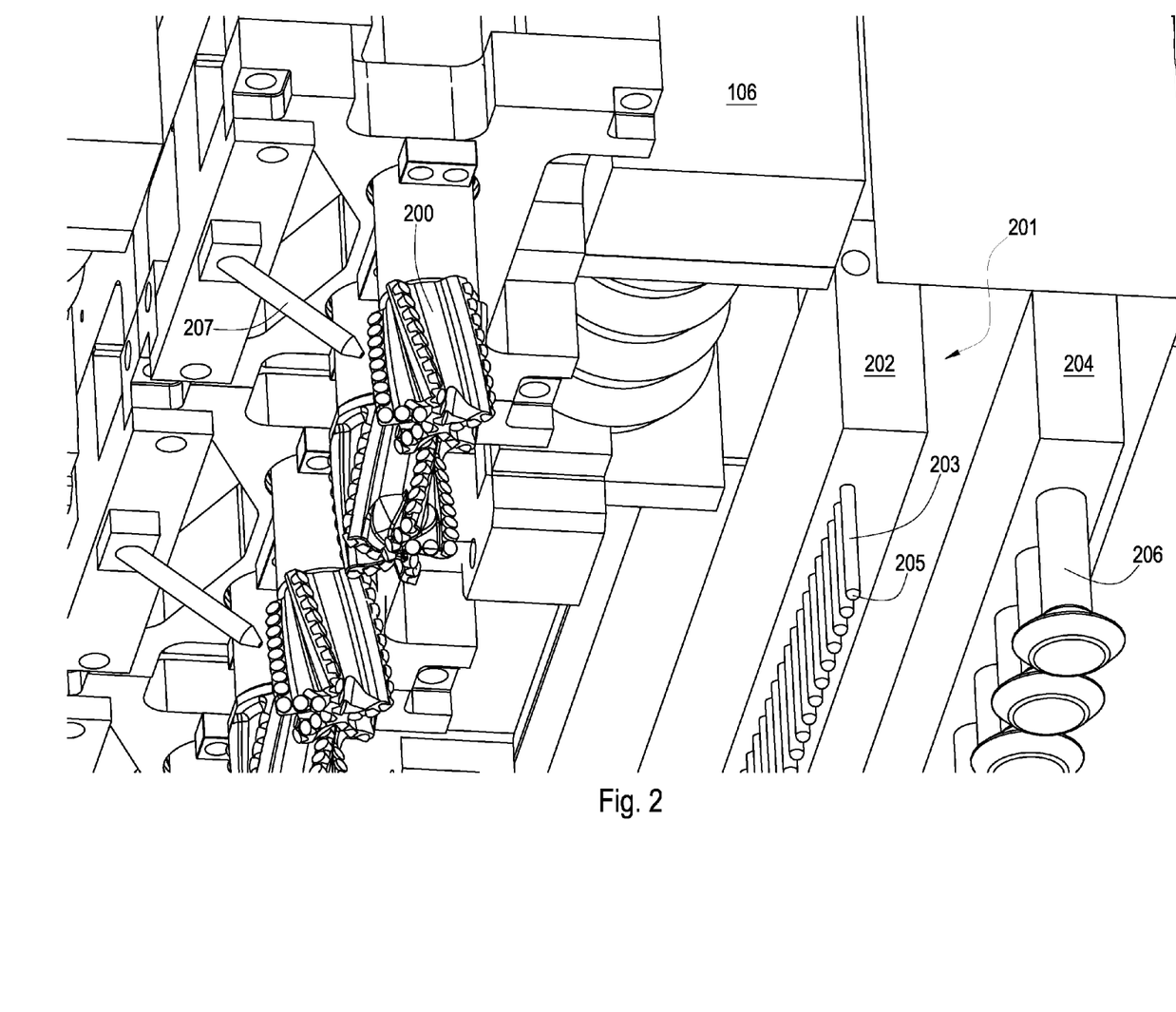
FIG. 2 is a perspective diagram of an embodiment of a portion of a slideable carriage.

FIG. 2 is a perspective diagram of an embodiment of a portion of the slideable carriage 106. To extend the carriages 106 beyond the outer edge of the motorized vehicle 100, each of the carriages 106 may include actuators, such as hydraulic cylinders, pneumatic cylinders, or other mechanical devices to move the carriages 106 to each side of the vehicle 100. These carriages 106 may include a plurality of rotary degradation elements 200 that rotate about an axis substantially normal to a plane defined by a paved surface. Each of these rotary degradation elements 200 may be used to degrade a paved surface in a direction substantially normal to their axes of rotation. The degradation elements 200 may comprise diamond.

The carriages may have fogging nozzles 207 positioned proximate the degradation elements 200. The nozzles may be designed to coat the degraded paved surface with a rejuvenating fog. The fog may be mixed with new aggregates and reclaimed paved surface constituents generated by the rotary degradation elements 200. A suitable fogging nozzle which may be compatible for the present invention may be purchased from McMaster-Carr® at their website http://www-.mcmaster.com/, part number 32215K11 or part number 32215K12.

Each carriage 106 may also include a rake 201 to level, smooth, and mix paved surface constituents, including new aggregates and reclaimed paved surface constituents generated by the rotary degradation elements 200. A rake 201 may include a housing 202 comprising multiple teeth 203 extending therefrom. In selected embodiments, each of the teeth 203 may be independently extended and retracted relative to the housing 202. This feature may allow selected teeth to be retracted to avoid obstacles such as manholes, grates, railroad tracks, or other obstacles in the roadway. In certain embodiments, each of the teeth 203 may comprise foaming elements 205 that may be hollow to accommodate a flow of pavement rejuvenation materials for deposit on a road surface.

The resulting mixture may then be smoothed and compacted to form a recycled paved surface. In selected embodiments, the rake 201 may comprise mixing elements which move side-to-side, front-to-back, in a circular pattern, vibrate, or the like to aid in mixing the resulting mixture of paved surface constituents and rejuvenation materials. In certain embodiments, each carriage 106 may include a bank 204 of one or more compacting elements 206 to compact the recycled road surface. In the current embodiment the compacting elements 206 are tampers. Like the teeth 203, the tampers may, in certain embodiments, be independently extendable and retractable relative to the bank 204.

Figure 3:
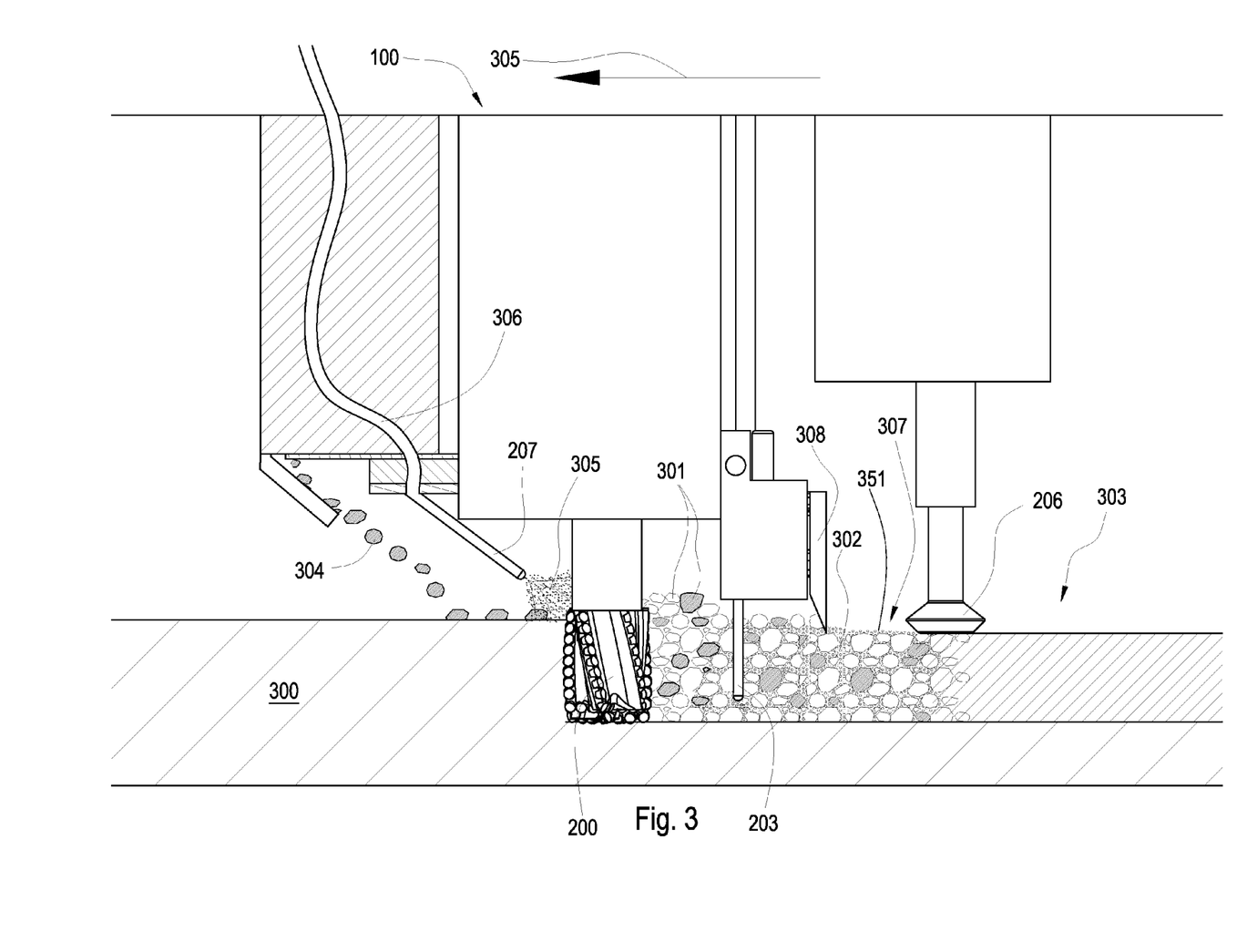
FIG. 3 is a perspective diagram of another embodiment of an asphalt recycling machine.

Referring to FIG. 3, an asphalt recycling machine may progressively degrade an old paved surface 300 into paved surface constituents 301, add rejuvenation materials 302 to the layer of paved surface constituents 301, level a mixture of rejuvenation material 302 and paved surface constituents 301, and compact the mixture into new paved surface 303.

As the asphalt recycling machine moves forward in the direction indicated by the arrow 350, new aggregate 304 may be deposited on the old paved surface 300. The new aggregate 304 may be added to compensate for any crushing, deterioration or loss of old aggregate during the degradation of the asphalt surface in addition to changes in the old aggregate or other paved surface constituents 301 that may have occurred over the life of the asphalt surface 300. A rejuvenating fog 305 may be deposited on the new and old paved surface constituents from the fogging nozzle 207 prior to, during and/or after degradation of the old paved surface 300. The rejuvenating fog 305 may comprise water, gas, polymers, synthetic clay, wax, oil based substance, surfactant, maltenes, asphaltenes, or combinations thereof. The rejuvenating fog 305 may wet the constituents 301 to allow better adhesion to additional rejuvenation material 302 that may be added later, act as a dust suppressant, or restore maltene, asphaltene and/or asphalt content in the original aggregate that may have been lost due to wear and tear on the old paved surface 300.

The fogging nozzle 207 is in communication with a passageway 306. The passageway is in communication with a fluid source secured to the motorized vehicle 100 such that a fluid may flow from the fluid source to the fogging nozzle 207. The passageway 306 may be pressurized to between 100 psi and 3000 psi. The recycling machine may comprise pressure sensors which may regulate the pressure in the passageway 306. As pressure increases in the passageway 306, more fog 305 is emitted by the fogging nozzle. The pressure may be adjusted to modify the fluid particle size which may change depending on the particular recycling application. The nozzle 207 may comprise a valve to prevent dripping or leaking when the pressure drops below a certain amount. The fluid in the passageway 306 and proximate the nozzle 207 may also be heated to between 100 F and 225 F. Heating the fluid may help it to adhere to the paved surface constituents 301, as well as diffuse more quickly into the constituents 301.

The nozzle 207 may emit fog 305 comprising fluid particles smaller than 200 microns. A fog 305 may cover more surface area of the paved surface constituents 301 more quickly than a spray with the same amount of fluid since fog comprises smaller fluid particles than a spray.

In the preferred embodiment, old aggregate may be dislodged from the old paved surface 300, rather than crushed in the process. After passing through the rotary degradation elements 200, the old paved surface may become a layer comprising a mixture of recovered constituents and new aggregate.

The teeth 203 of rake 201 may comprise at least one channel and an opening. Pavement rejuvenating materials 302 may be added to a layer 307 of paved surface constituents 301 below the surface 351 of the layer 307. The teeth 203 may comprise a special diamond tip that allows it to drag against the bottom of the layer 307 of constituents while injecting rejuvenation materials 302 into the layer 307 which may foam under atmospheric pressure.

A screed 308 may be used to level the layer 307 and prepare it for compaction by a tamper 206 or other discrete elements such as vibratory rollers and/or vibratory sleds. Once compacted, the new paved surface 303 may be finished and sealed to provide protection against the elements, and tests on the new paved surface 303 may be performed to collect feedback on the recycling process.

Figure 4:
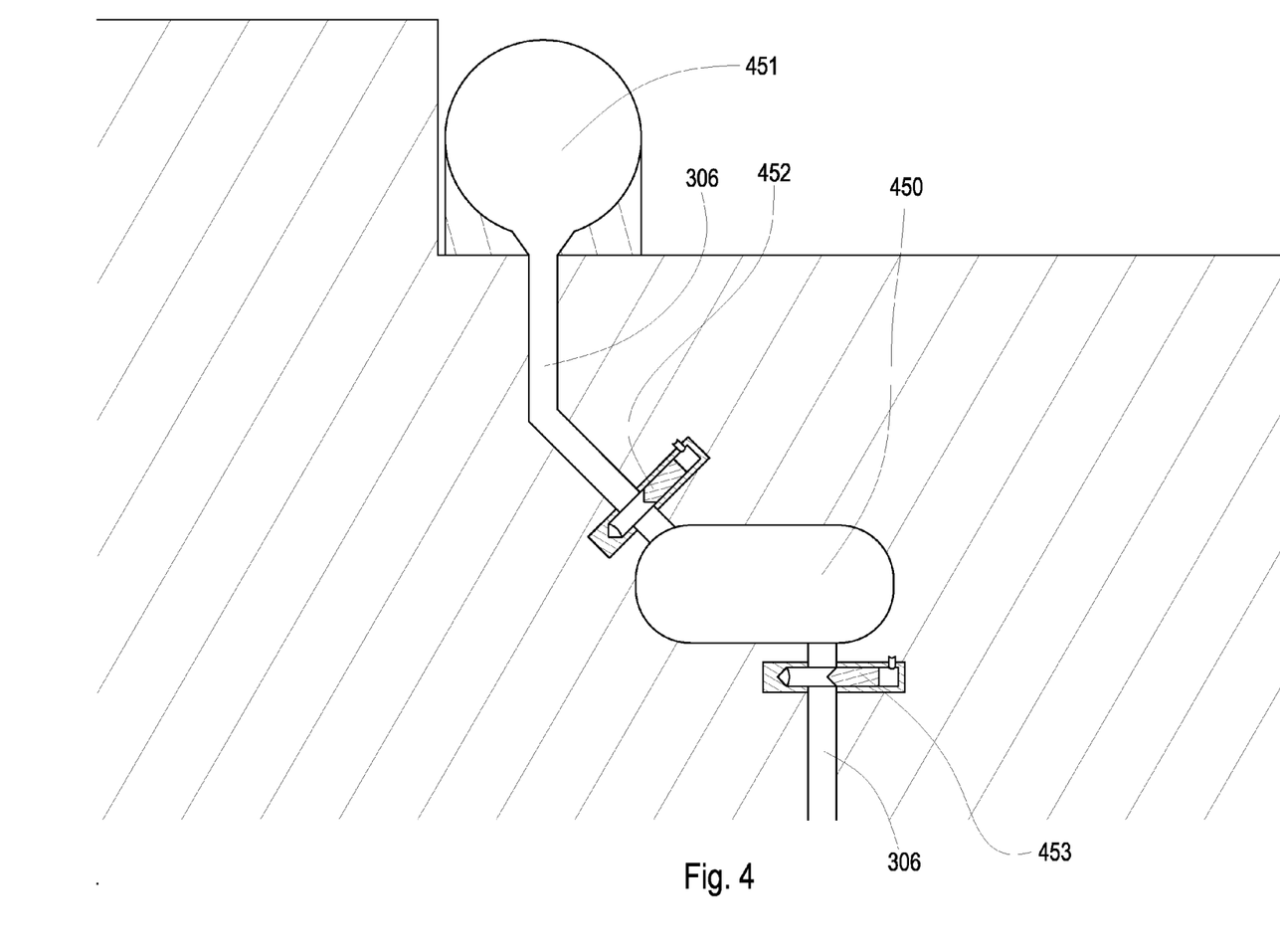
FIG. 4 is a cross-sectional diagram of an embodiment of a channel in communication with a fluid source.

In the embodiment of FIG. 4, the asphalt recycling machine may comprise an accumulator 450 intermediate the fluid source 451 and the fogging nozzle 207 and in communication with the passageway 306. The accumulator 450 may receive fluid from the fluid source 451 at regular intervals or when the accumulator is empty. The accumulator 450 may be pressurized to a pressure between 100 psi and 3000 psi by a pump from the fluid source 451 or by another means. This may allow the accumulator 450 to supply fluid to the fogging nozzle 207 at a lower pressure and with more variance than the pump may be able to supply.

The accumulator 450 may comprise a first valve 452 to regulate the flow of fluid from the fluid source 451. The accumulator 450 may also comprise a second valve 453 to regulate the flow of fluid to the fogging nozzle 207. The passageway 306 may be in-between the fluid source 451 and the accumulator 450, or between the fogging nozzle 207 and the accumulator 450, or the passageway 306 may be furcated by the accumulator 450. The accumulator 450 may be heated to a temperature between 100 F and 225 F.

Figure 5:
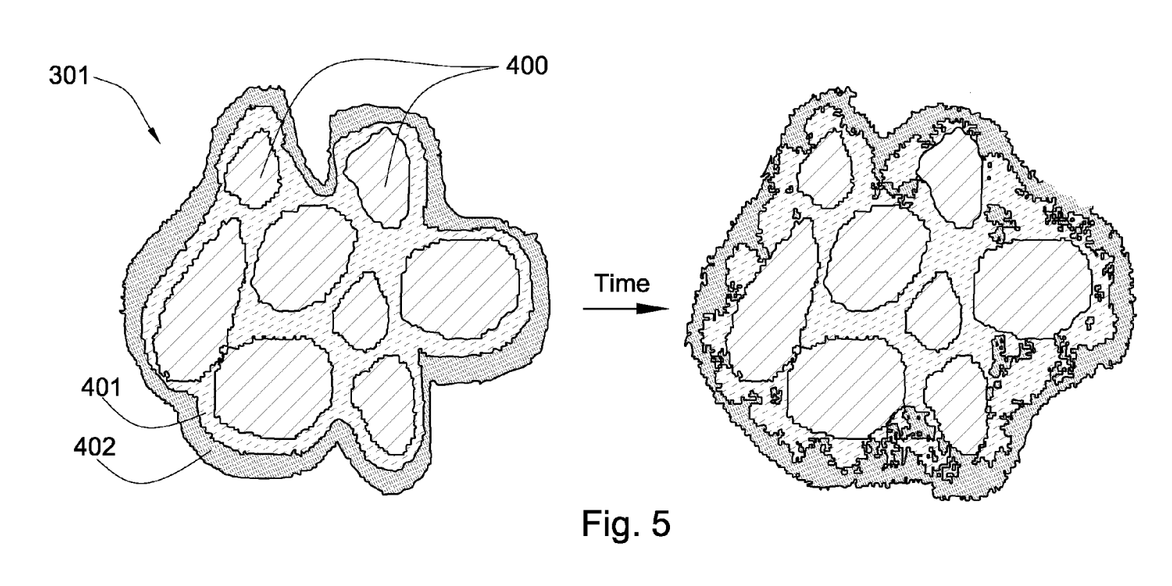
FIG. 5 is a cross-sectional diagram of an embodiment of paved surface constituents.
Figure 6:
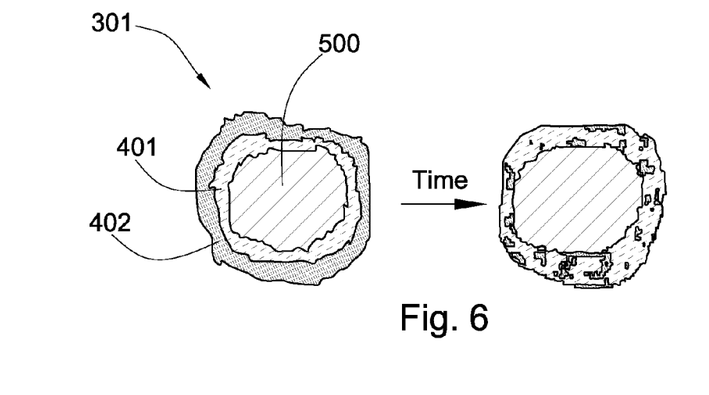
FIG. 6 is a cross-sectional diagram of another embodiment of paved surface constituents.

The paved surface constituents 301 of FIG. 5 comprise a cluster of reclaimed asphalt aggregate particles 400 bound together with old asphalt 401. When rejuvenating fog 305 is applied to the cluster, maltenes 402 or other rejuvenating materials in the fog 305 may diffuse into the cluster, which may restore at least some of the strength or elasticity of the asphalt 401. In the embodiment of FIG. 6, the paved surface constituents 301 comprise a single aggregate particle 500 surrounded by old asphalt 401. In this embodiment, the rejuvenating fog 305 may coat the entire aggregate particle 500 more quickly than in the embodiment of FIG. 5. Due to a decreased distance for the rejuvenating materials to diffuse through, a desired asphalt mixture may be achieved in a shorter amount of time than if the aggregate particles 400 are in a cluster, though the rejuvenating materials may still diffuse evenly when the aggregate particles 400 form clusters.

Figure 7:
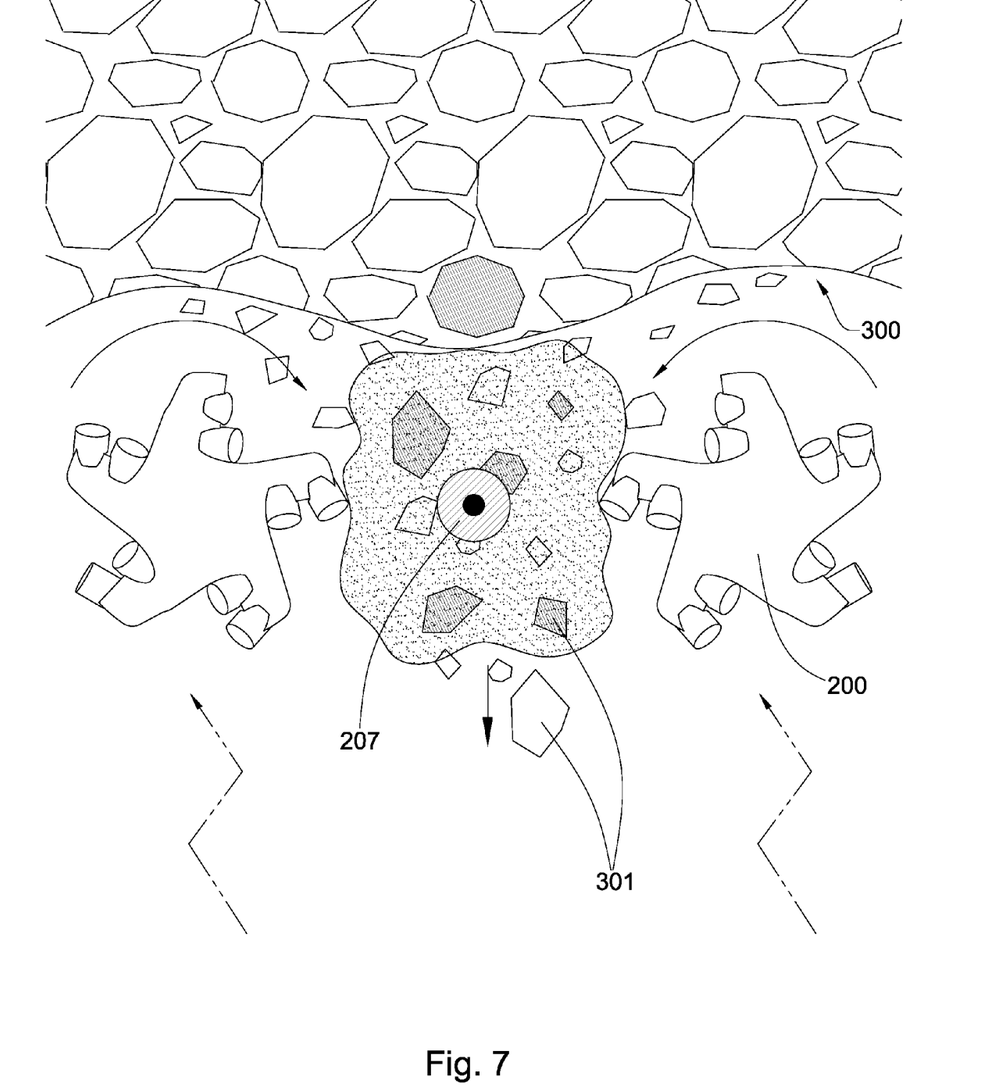
FIG. 7 is a cross-sectional diagram of another embodiment of a fogging nozzle.

Referring to FIG. 7, the rotary degradation elements 200 may spin in opposite directions, helping incorporate new aggregate 304 with paved surface constituents 301 recovered from the degradation of the old pavement surface 300. The rotary degradation elements 200 may move side to side as the asphalt recycling machine moves forward into the original pavement surface 300. Each degradation element 200 may also be able to individually move up and down to avoid obstacles such as manholes.

Figure 8:
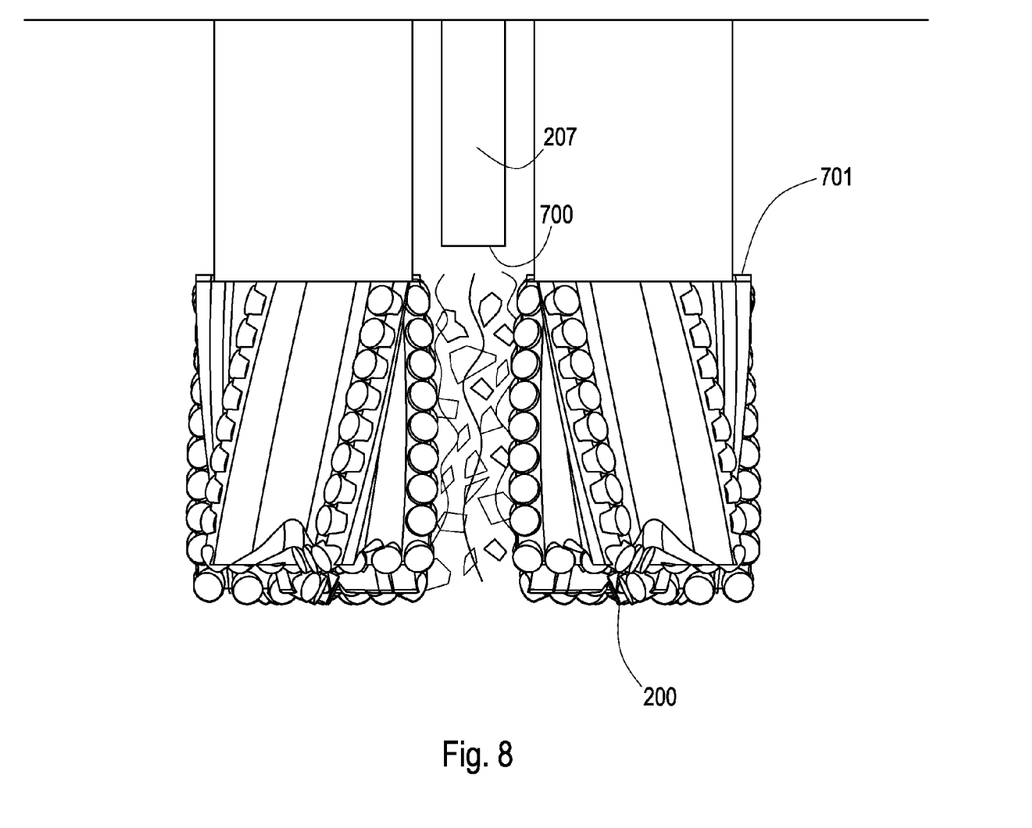
FIG. 8 is a perspective diagram of another embodiment of a fogging nozzle.

The fogging nozzle 207 may be positioned in-between two rotary degradation elements 200 such that the nozzle 207 fogs in a direction substantially normal to the paved surface. A lower end 700 of the nozzle 207 may be positioned above an upper end 701 of the degradation elements 200, shown in FIG. 8. In this configuration, the degradation elements 200 may be positioned closely together to prevent larger paved surface constituents 301 from passing between them before being degraded. In another embodiment, as in FIG. 9, the lower end 700 of the nozzle 207 may be positioned below the upper end 701 of the degradation elements 200. The degradation elements 200 may be positioned farther apart to allow room for the nozzle 207. The nozzle 207 may be robust enough to prevent larger paved surface constituents 301 from passing between the nozzle 207 and the degradation elements 200 before being degraded. The nozzle 207 may also have a number of openings 800 pointing radially outward, which may fog the paved surface constituents 301 as they are degraded and as they pass between the nozzle 207 and the degradation elements 200.

Figure 9:
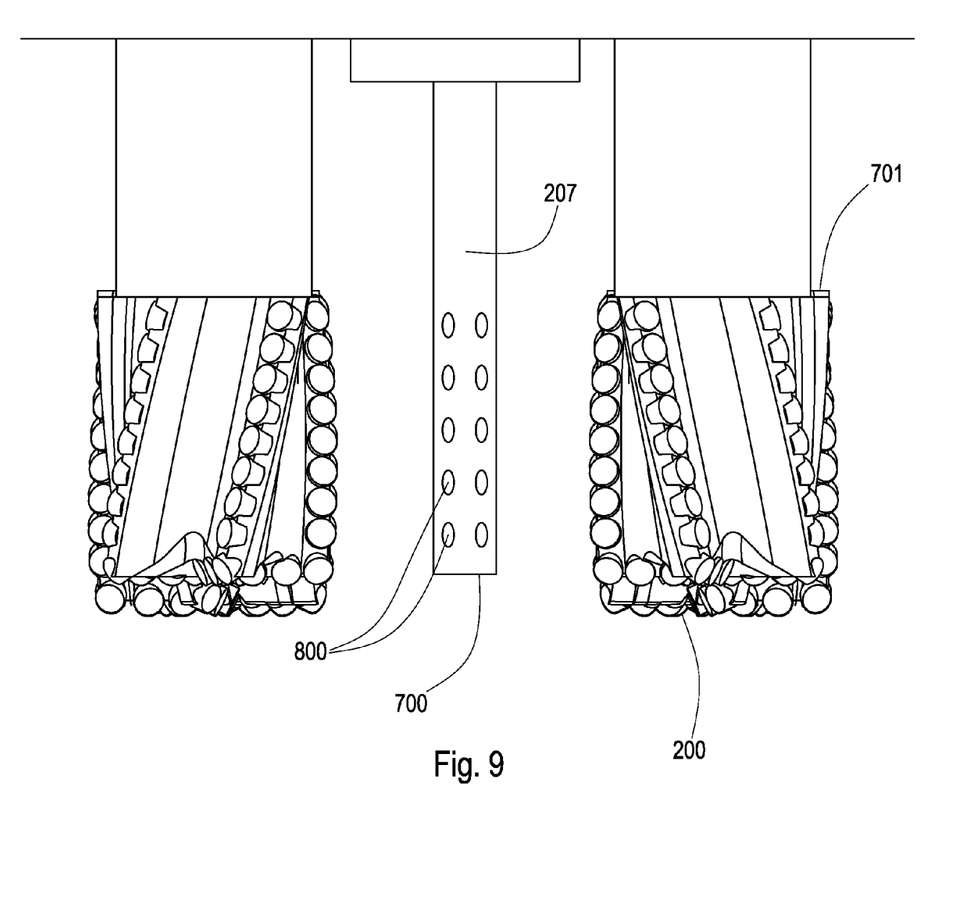
FIG. 9 is a perspective diagram of another embodiment of a fogging nozzle.

The nozzle 207 may be secured to a slideable carriage 106, allowing the nozzle 207 to move side to side with the movement of the degradation elements 200, or in an oscillating pattern. Each nozzle 207 may be able to individually move up and down to avoid obstacles such as manholes. The nozzle 207 may also be positioned in front of the degradation elements 200 or behind the degradation elements 200 or in any position proximate the degradation elements 200. The nozzle 207 may also fog at any angle from the normal of the paved surface 300.

Figure 10:
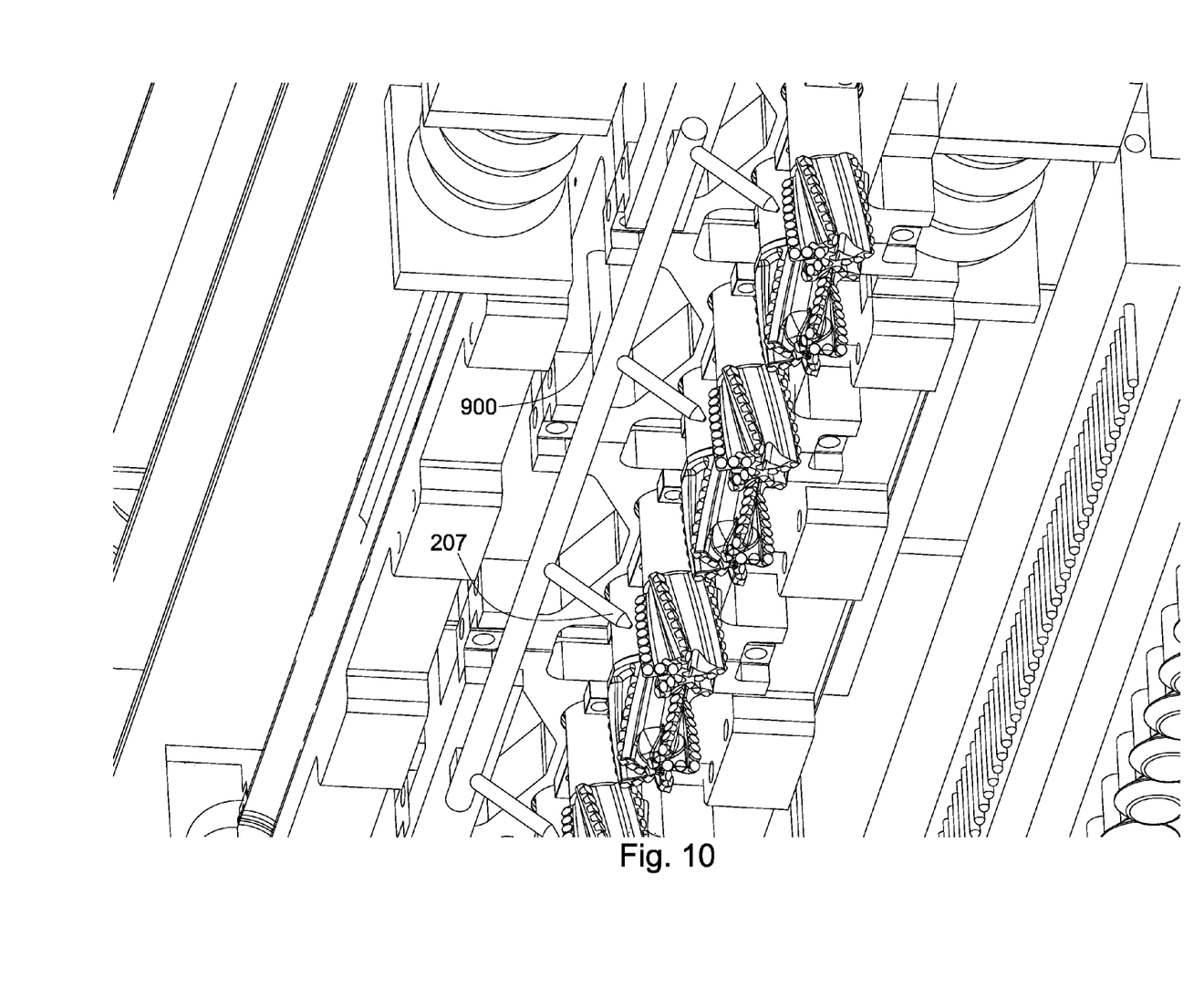
FIG. 10 is a perspective diagram of another embodiment of a plurality of fogging nozzles.

Referring to FIG. 10, the fogging nozzle 207 may be attached to a hollow rod 900 which extends from the underside 107 of the vehicle 100. The hollow rod 900 may comprise a portion of the passageway 306 in communication with the fluid source. The hollow rod 900 may span the row of degradation elements 200, comprising a plurality of fogging nozzles 207, each proximate a separate pair of degradation elements 200.

Figure 11:
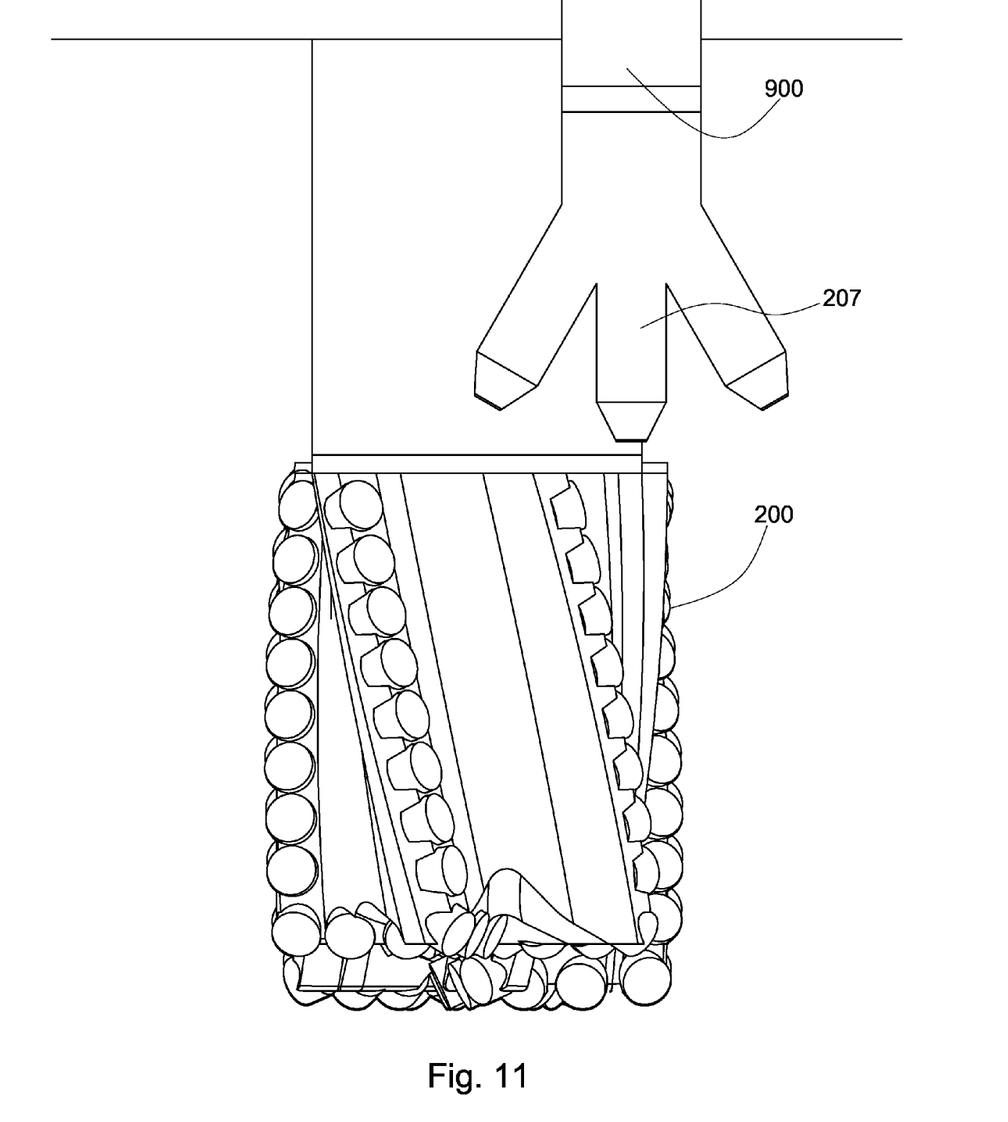
FIG. 11 is a perspective diagram of another embodiment of a plurality of fogging nozzle.

The hollow rod 900 may also comprise a plurality of fogging nozzles 207 proximate a rotary degradation element 200. Each individual nozzle 207 may fog in a separate direction as in FIG. 11. The rod 900 may be able to translate or rotate to avoid obstacles on the paved surface 300. The rod 900 may be made from steel or another durable material.

Figure 12:
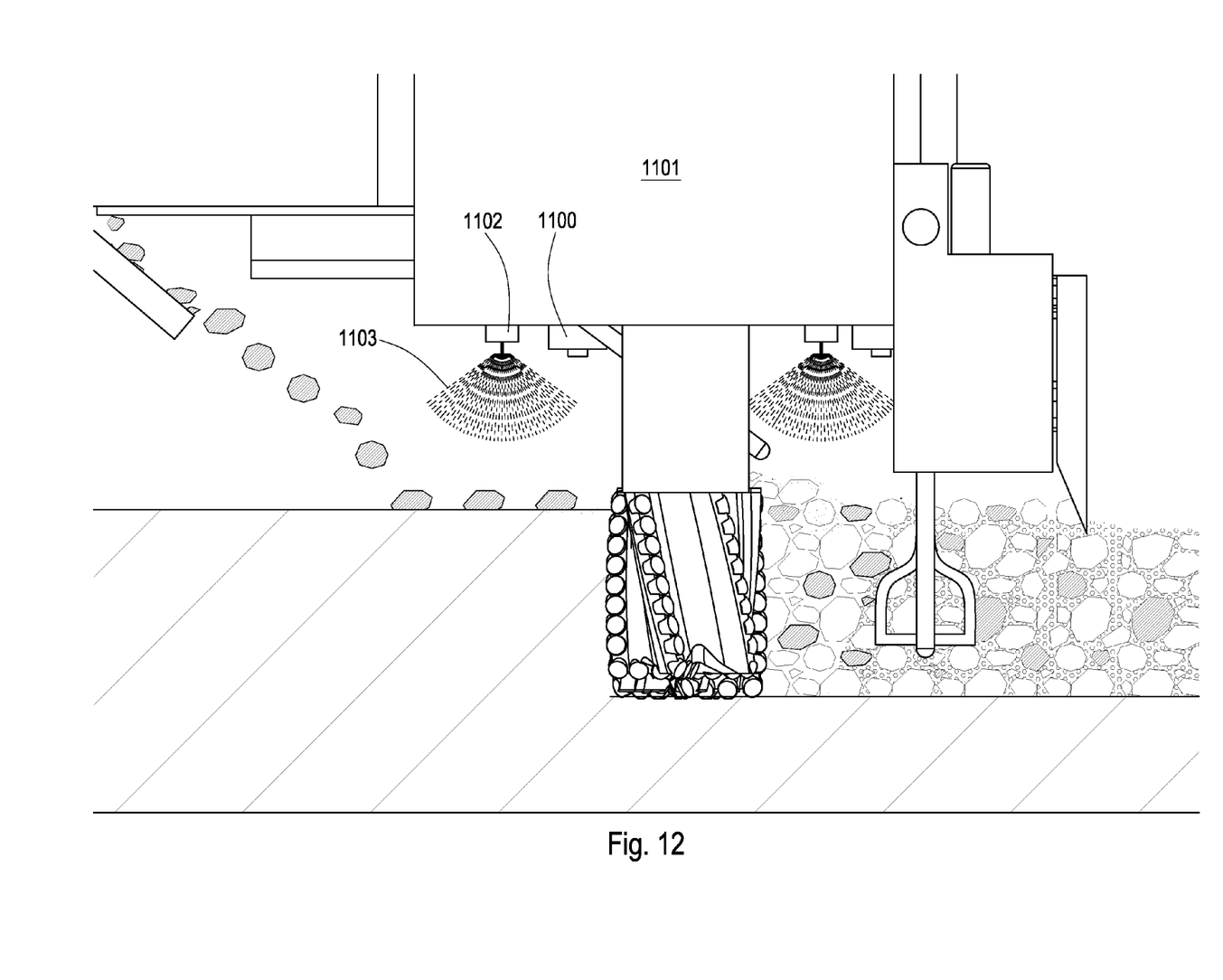
FIG. 12 is a perspective diagram of an embodiment of a fire extinguishing system.

The asphalt recycling machine may comprise various sensors 1100 proximate the fogging nozzle 207 selected from the group consisting of pressure sensors, temperature sensors, position sensors, optical sensors, and acoustic sensors. In the embodiment of FIG. 12, the sensors 1100 are temperature sensors. The sensor 1100 may be in communication with electronics contained within the shroud 102. The sensor 1100 may indicate when the temperature proximate the carriage 106 rises above a certain level and may trigger a fire extinguishing system to activate. The fire extinguishing system may cause the rejuvenating fog 305 to stop flowing. The fire extinguishing system may also send a signal to an operator of the asphalt recycling machine, indicating a possible fire. The fire extinguishing system may comprise one or more extinguishing nozzles 1102 for the purpose of emitting a fire retardant material 1103, such as $CO_2$. The fire extinguishing system may also comprise an exhaust assembly, which may allow an oxygen depleted gas to flow underneath the carriage.

Figure 13:
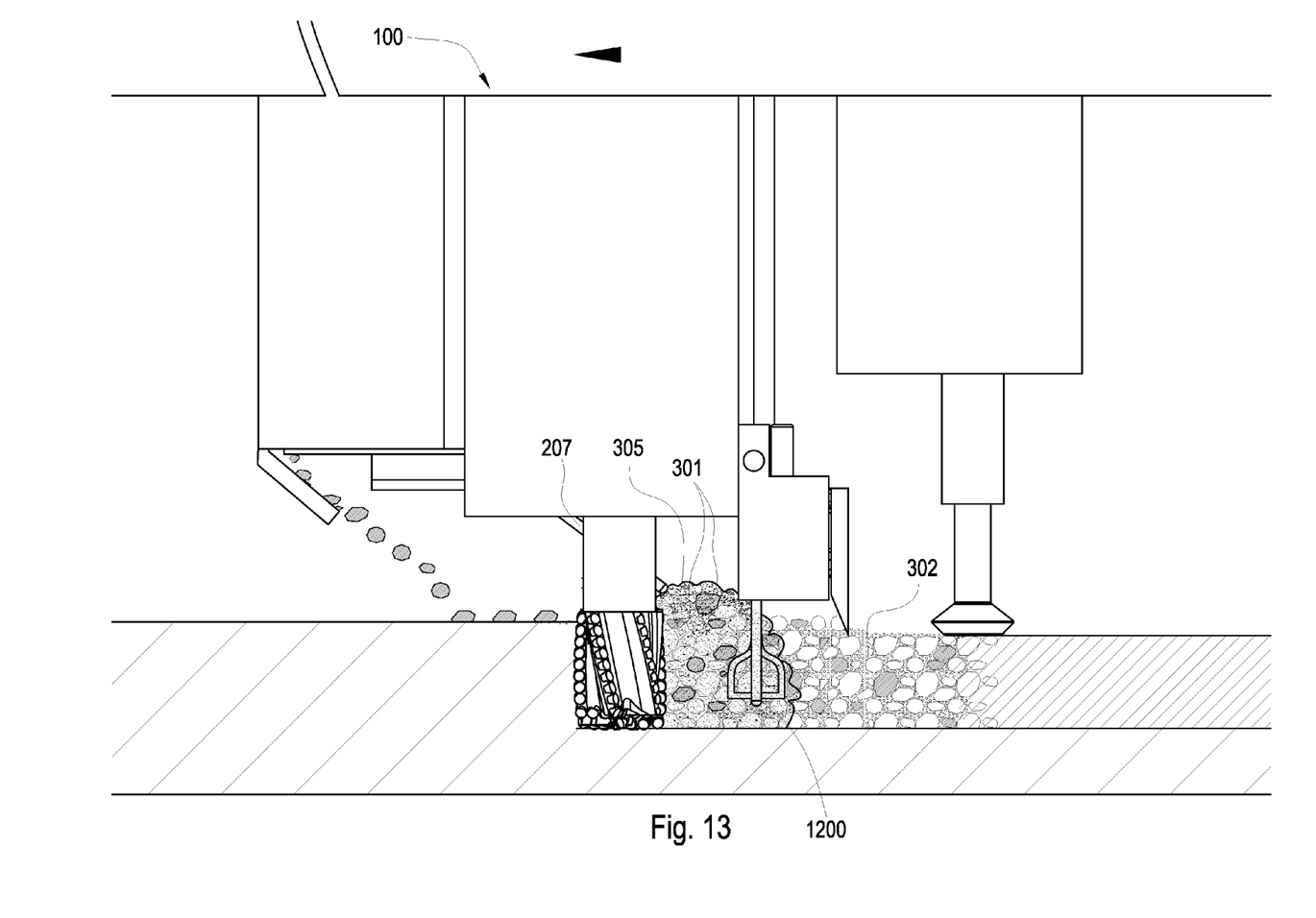
FIG. 13 is a perspective diagram of an embodiment of a mixing element.

Referring to FIG. 13, the asphalt recycling machine may comprise a plurality of mixing elements 1200 connected to the underside 107 of the machine. In this embodiment, the fogging nozzle 207 is the only means of supplying rejuvenating material 302 to the paved surface constituents 301. The plurality of mixing elements 1200 may mix, stir, lift, or otherwise agitate the constituents 301 so that the fog 305 emitted by the fogging nozzle 207 may coat all of the constituents 301 thoroughly.

Figure 14:
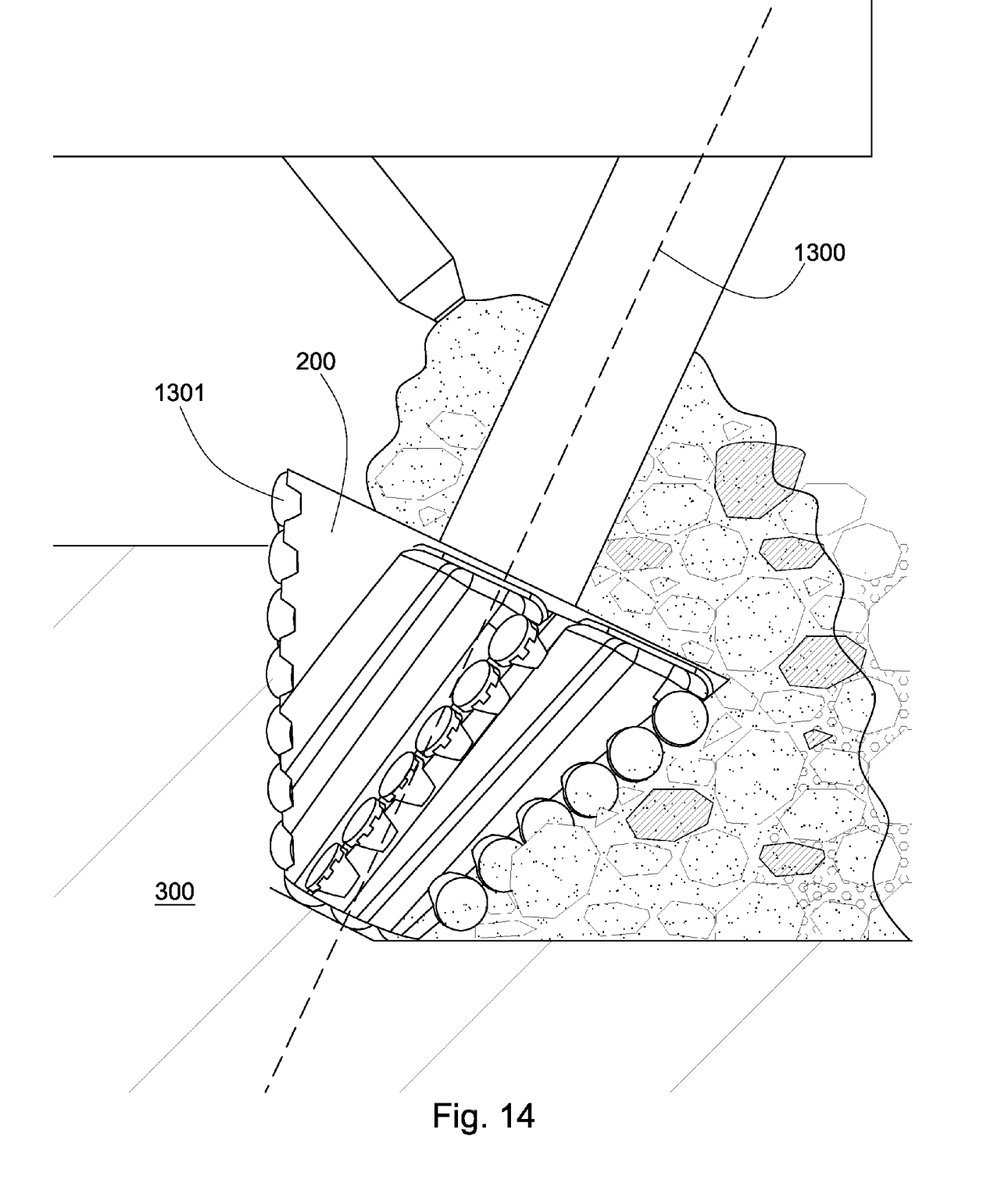
FIG. 14 is a perspective diagram of an embodiment of a degradation element.

Referring now to FIG. 14, the rotary degradation element 200 may comprise any axis of rotation 1300 which is nonparallel to the paved surface 300. The rotary degradation element 200 may also comprise any material, shape, or distribution of inserts 1301. This may help to redistribute wear and tear on the degradation element 200 or inserts 1301. In some applications, tilting the degradation element 200 may increase efficiency and speed. The axis of rotation 1300 may also be changed during operation of the recycling machine for different paved surface compositions or slopes.

Figure 15:
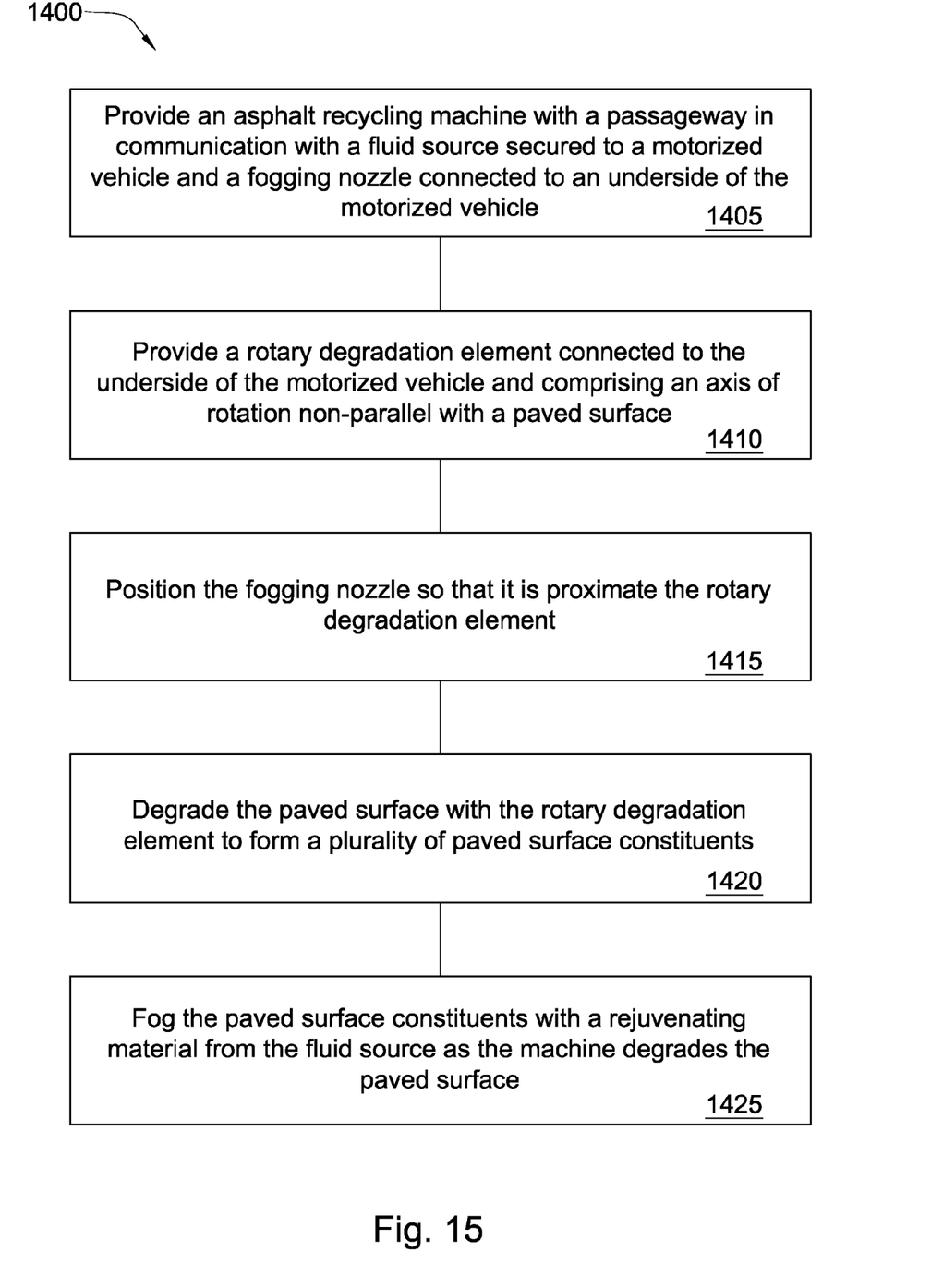
FIG. 15 is a method for rejuvenating a paved surface.

A method 1400 for rejuvenating a paved surface, referring to FIG. 15, comprises the steps of providing 1405 an asphalt recycling machine with a passageway in communication with a fluid source secured to a motorized vehicle and a fogging nozzle connected to an underside of the motorized vehicle; providing 1410 a rotary degradation element connected to the underside of the motorized vehicle and comprising an axis of rotation nonparallel with the paved surface; positioning 1415 the fogging nozzle so that it is proximate the rotary degradation element; degrading 1420 the paved surface with the rotary degradation element to form a plurality of paved surface constituents; and fogging 1425 the paved surface constituents with a rejuvenating material from the fluid source.

Whereas the present invention has been described in particular relation to the drawings attached hereto, it should be understood that other and further modifications apart from those shown or suggested herein, may be made within the scope and spirit of the present invention.

What is claimed is:

1. An asphalt recycling machine comprising:
   a passageway in communication with a fluid source secured to a motorized vehicle, the passageway also in communication with a fogging nozzle;
   the fogging nozzle being connected to an underside of the motorized vehicle;
   the fogging nozzle also being proximate rotary degradation elements connected to the underside of the motorized vehicle, the rotary degradation elements each comprising an axis of rotation non-parallel with a paved surface;
   wherein each degradation element is able to individually move up and down.

2. The machine of claim 1, wherein a fluid in the fluid source comprises an asphalt rejuvenating material.

3. The machine of claim 2, wherein the rejuvenating material comprises particles smaller than 200 microns.

4. The machine of claim 2, wherein the rejuvenating material comprises water, a gas, polymers, synthetic clay, wax, oil based substance, surfactant, maltenes, asphaltenes, or combinations thereof.

5. The machine of claim 1, wherein the asphalt recycling machine comprises sensors proximate the fogging nozzle selected from the group consisting of pressure sensors, temperature sensors, position sensors, optical sensors, and acoustic sensors.

6. The machine of claim 1, wherein the asphalt recycling machine comprises a fire extinguishing system proximate the fogging nozzle.

7. The machine of claim 1, wherein the ability of each degradation element to individually move up and down is by tilting the axis of rotation during operation.

8. The machine of claim 1, wherein the asphalt recycling machine comprises a foaming asphalt injector also connected to the underside of the machine.

9. The machine of claim 1, wherein the asphalt recycling machine comprises a plurality of mixing elements connected to the underside of the machine.

10. The machine of claim 1, wherein the asphalt recycling machine comprises a heating element connected to the underside of the machine.

11. The machine of claim 1, wherein the asphalt recycling machine comprises a plurality of compacting elements connected to the underside of the machine.

12. The machine of claim 1, wherein the asphalt recycling machine comprises a screed.

13. The machine of claim 1, wherein the asphalt recycling machine comprises an accumulator intermediate the fluid source and the fogging nozzle and in communication with the passageway.

14. The machine of claim 1, wherein the fogging nozzle is positioned in-between at least two rotary degradation elements.

15. The machine of claim 1, wherein the fogging nozzle is attached to a hollow rod which extends from the underside of the vehicle and also comprises a portion of the passageway in communication with the fluid source.

16. The machine of claim 15, wherein the hollow rod comprises a plurality of fogging nozzles.

17. The machine of claim 1, wherein the fogging nozzle is connected to a slideable carriage connected to a bearing surface of the underside.

18. The machine of claim 1, wherein the passageway proximate the fogging nozzle is capable of being pressurized to between 100 psi and 3000 psi.

19. The machine of claim 1, wherein a fluid in the passageway and proximate the fogging nozzle is capable of being heated to between 100 F and 2250 F.

20. The machine of claim 1, wherein the axis of rotation non-parallel with the paved surface comprises an axis of rotation substantially normal to the paved surface.

* * * * *